United States Patent
Pirovano

(12) 
(10) Patent No.: US 6,229,092 B1
(45) Date of Patent: May 8, 2001

(54) CABLE FOR MATERIAL HANDLING SYSTEMS IN A CONVEYANCE DUCT

(76) Inventor: Paolo Pirovano, Via Roma, 29, 24030 Medolago, Bergamo (IT)

( * ) Notice: Subject to any disclaimer, the term of this patent is extended or adjusted under 35 U.S.C. 154(b) by 0 days.

(21) Appl. No.: 09/503,699

(22) Filed: Feb. 14, 2000

(51) Int. Cl.[7] .................................................. H02G 15/00
(52) U.S. Cl. ............................................. 174/93; 138/123
(58) Field of Search .................... 174/15.6, 15.7, 174/74 A, 93, 73.1; 138/106, 123, 128, 152, 156, 160

(56) References Cited

U.S. PATENT DOCUMENTS

| | | | |
|---|---|---|---|
| 1,641,142 | * | 8/1927 | Johnson ........................ 138/123 X |
| 3,108,357 | * | 10/1963 | Liebig ........................... 138/123 X |
| 4,045,604 | * | 8/1977 | Clabburn ....................... 174/73.1 |
| 5,280,136 | * | 1/1994 | Yaworski et al. .............. 174/73.1 |
| 6,012,742 | * | 1/2000 | Kocian et al. ................. 138/123 X |

* cited by examiner

*Primary Examiner*—Dean A. Reichard
*Assistant Examiner*—Chau N. Nguyen
(74) *Attorney, Agent, or Firm*—Shlesinger, Fitzsimmons & Shlesinger

(57) ABSTRACT

A cable for loose-material handling systems inside a conveyance duct includes a core (11) having a plurality of strands (12) woven together, a covering sheath (14) for the core and disk-shaped members (17) molded on the sheath (14) for entrainment of the loose material. The sheath (14) includes a mesh of strands (15) with thick weft forming with the cable axis (13) an angle greater than that of the strands (12) of the core (11). A seam (16) between the sheath (14) and the core (11) is provided at least at the disk-shaped members (17).

7 Claims, 1 Drawing Sheet

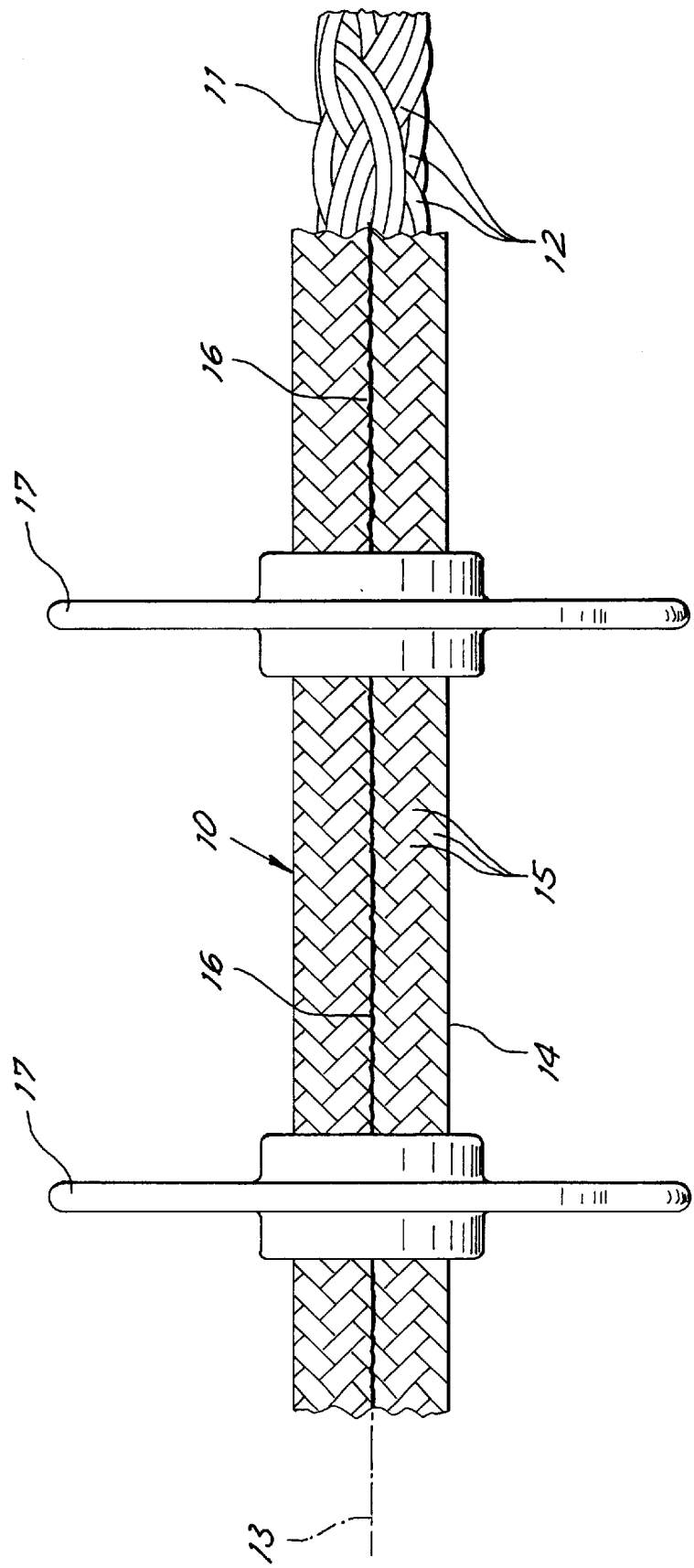

CABLE FOR MATERIAL HANDLING SYSTEMS IN A CONVEYANCE DUCT

BACKGROUND OF THE INVENTION

The present invention relates to a cable for handling systems and in particular of the radial disk type for entrainment of materials with essentially fluid behavior inside tubular ducts within which the cable runs, for example for distribution of feed in animal breeding farms or for handling of generally powdery or granular materials in industrial plants.

In systems of this type it is required that the cable be essentially inextensible in the direction of motion and have high flexibility and wear resistance.

To produce cables with these characteristics it is advantageous to use a core consisting of a plurality of strands woven together loosely in a direction near the axis of the cable and cover it with a sheath consisting of a thick wefted strand mesh braided at a high angle with respect to the cable axis.

But the radial members commonly used for handling loose materials cannot be molded on cables made in this manner. Indeed, under these conditions the radial handling members are constrained only to the external sheath and the stresses to which they are subject are not born by the cable core which is the strongest member.

In addition sliding of the sheath on the cable core is induced with resulting change in the pitch between the handling members. This change is unacceptable in systems where the cable is entrained by wheels with teeth which engage with the radial handling members.

For cables with plastic surface sheaths it is proposed to incorporate in the radial members a pin transversal to the cable to anchor them to the core. However it was found that a radial member thus realized is not satisfactory because driving it into the cable results in damage to the fibers and localized stresses resulting in breakage, even by fatigue, which considerably reduces cable life.

In the production of cables it is expedient that the core be formed from a braid with strands making a low angle with the cable axis, for example less than 45°, to minimize cable lengthening and raise its flexibility. Cables with loose braid of this type are not suited to coming into contact with powdery materials which would collect in large quantities between the strands. To avoid this drawback the cable can be covered with a braiding with very thick weave and therefore with high-angle fibers with respect to the cable axis.

A cable produced in this manner was however considered completely unsuited to being equipped with radial members made of thermoplastic material for direct molding on the cable. The compactness of the sheath prevents all possible catching of the plastic material on the cable core with the above mentioned drawbacks.

The purpose of the present invention is to find a solution allowing use in handling systems of a cable of the type mentioned equipped with a braided surface sheath making it suitable to receive heat molded radial members on the cable integrally constrained thereto with no possibility of sliding.

SUMMARY OF THE INVENTION

It was accordingly sought to provide in accordance with the present invention a cable for loose-material handling systems inside a conveyance duct and comprising a core consisting of a plurality of strands woven together, a covering sheath for said core and disk-shaped members molded on said sheath for entrainment of the loose material with the sheath consisting of a mesh of strands with thick weft forming with the cable axis an angle greater than the core strands with a seam between the sheath and the core being provided at least at the disk-shaped members.

BRIEF DESCRIPTION OF THE DRAWING

To clarify the explanation of the innovative principles of the present invention and its advantages compared with the prior art there is described below with the aid of the only annexed drawing a possible embodiment thereof by way of non-limiting example applying said principles. In the annexed FIGURE is shown a portion of cable 10 provided in accordance with the present invention.

DETAILED DESCRIPTION OF THE INVENTION

The cable 10 comprises a core 11 consisting of a plurality of strands 12 woven together with direction essentially longitudinal with the axis 13 of the cable so as to ensure appreciable inextensibility of the cable in axial direction. By the term 'essentially longitudinal' is meant here a strand winding direction forming with the cable axis direction an angle equal to or less than 20° and preferably equal to or less than 10°.

Advantageously the strands 12 are wound with a loose weave so as to ensure high cable flexibility.

The cable 10 also comprises a sheath 14 for covering the core 11 and consisting of a mesh of strands 15 with thick weft and direction essentially transverse to the axis 13 of the cable so as to ensure high radial inextensibility of the cable. By the term 'essentially transversal' is meant a strand extension direction forming with the cable axis direction an angle equal to or greater than 45° and preferably between 45° and 60°.

It is noted that the thick sheath weft preventing dilation or swelling of the cable constitutes effective prevention of any penetration into the core of particles of the conveyed material. It also constitutes effective protection against possible damage to the longitudinal fibers constituting the resistant structure of the cable by abrasion against fixed parts along the cable path.

During production of the cable the sheath 14 is fastened permanently to the core 11 by means of a seam 16 extending longitudinally with the cable axis. Advantageously the seam is provided passing through the core 11 to alternately sew diametrically opposite portions of the sheath 14.

As an alternative the seam 16 could be provided separately on two diametrically opposite parts of the sheath 14 and in any case reaching the central portion of the core 11. Thanks to the seam 16 the core 11 and sheath 14 are integrated with each other to prevent any mutual sliding of the two parts.

Appropriately spaced along the cable are formed radial disks 17 for entrainment of the materials inside the conveyance ducts. During molding of the disks the seam 16 is incorporated in the molding material to provide a strong anchorage of the disks to the cable core.

It is clear that a cable provided in accordance with the present invention optimally achieves the preset purposes. Naturally the above description of an embodiment applying the innovative principles of the present invention is given by way of non-limiting example of said principles within the scope of the exclusive right claimed here.

For example the seam 16 could be provided only at the sections of the cable designed to be incorporated in the disks 17.

What is claimed is:

1. Cable comprising a core consisting of a plurality of strands woven together, a covering sheath for said core and disk-shaped members molded on said sheath for entrainment of loose material with the sheath consisting of a mesh of strands with thick weft forming with the cable axis an angle greater than that of the strands of the core with a seam between the sheath and the core being provided at least at the disk-shaped members for loose-material handling systems inside a conveyance duct.

2. Cable in accordance with claim 1 wherein the seam extends essentially for the entire cable length.

3. Cable in accordance with claim 1 wherein the seam is incorporated in the material of the disk-shaped members molded on the sheath.

4. Cable in accordance with claim 1 wherein the seam passes through the core to alternately sew diametrically opposite portions of the sheath.

5. Cable in accordance with claim 1 wherein the seam is provided separately in diametrically opposite portions of the sheath with each separate seam affecting the central portion of the core.

6. Cable in accordance with claim 1 wherein the strands which make up the core form with the direction of the cable axis an angle equal to or less than 20°.

7. Cable in accordance with claim 1 wherein the strands of the mesh making up the covering sheath form with the direction of the cable axis an angle equal to or greater than 45°.

* * * * *